Dec. 28, 1937.     B. A. ROSE     2,103,795
TURBINE GENERATOR FIELD WINDING
Filed Jan. 4, 1936     3 Sheets-Sheet 1

WITNESSES:
Michael Stark
Fred E. Williams

INVENTOR
Bennie A. Rose.
BY O. B. Buchanan
ATTORNEY

Dec. 28, 1937.   B. A. ROSE   2,103,795
TURBINE GENERATOR FIELD WINDING
Filed Jan. 4, 1936   3 Sheets-Sheet 2
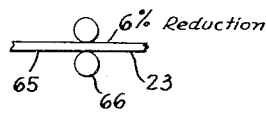
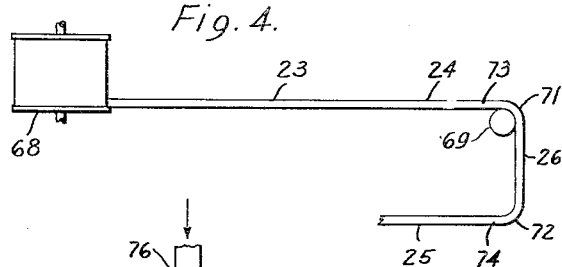
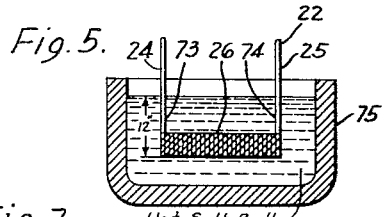
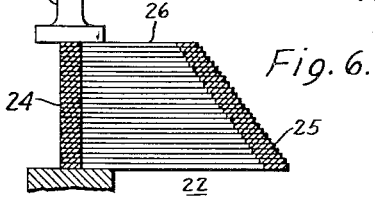
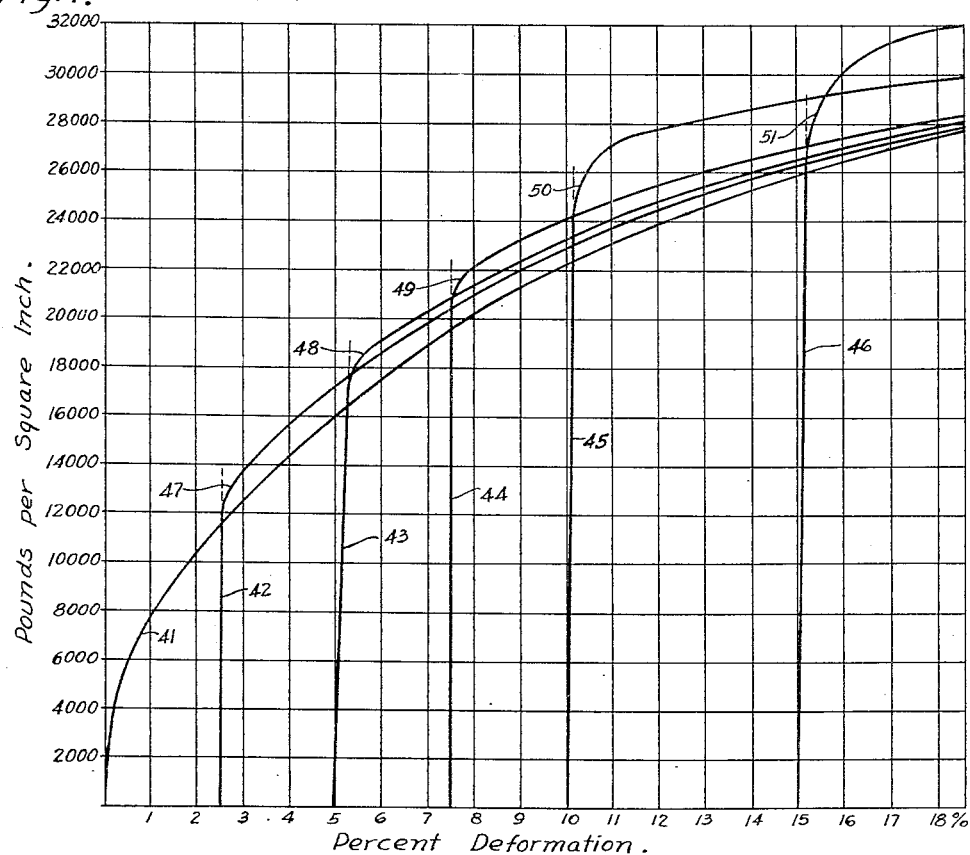
WITNESSES:
Michael Stark
INVENTOR
Bennie A. Rose.
BY
O. B. Buchanan
ATTORNEY Dec. 28, 1937.  B. A. ROSE  2,103,795
TURBINE GENERATOR FIELD WINDING
Filed Jan. 4, 1936   3 Sheets-Sheet 3
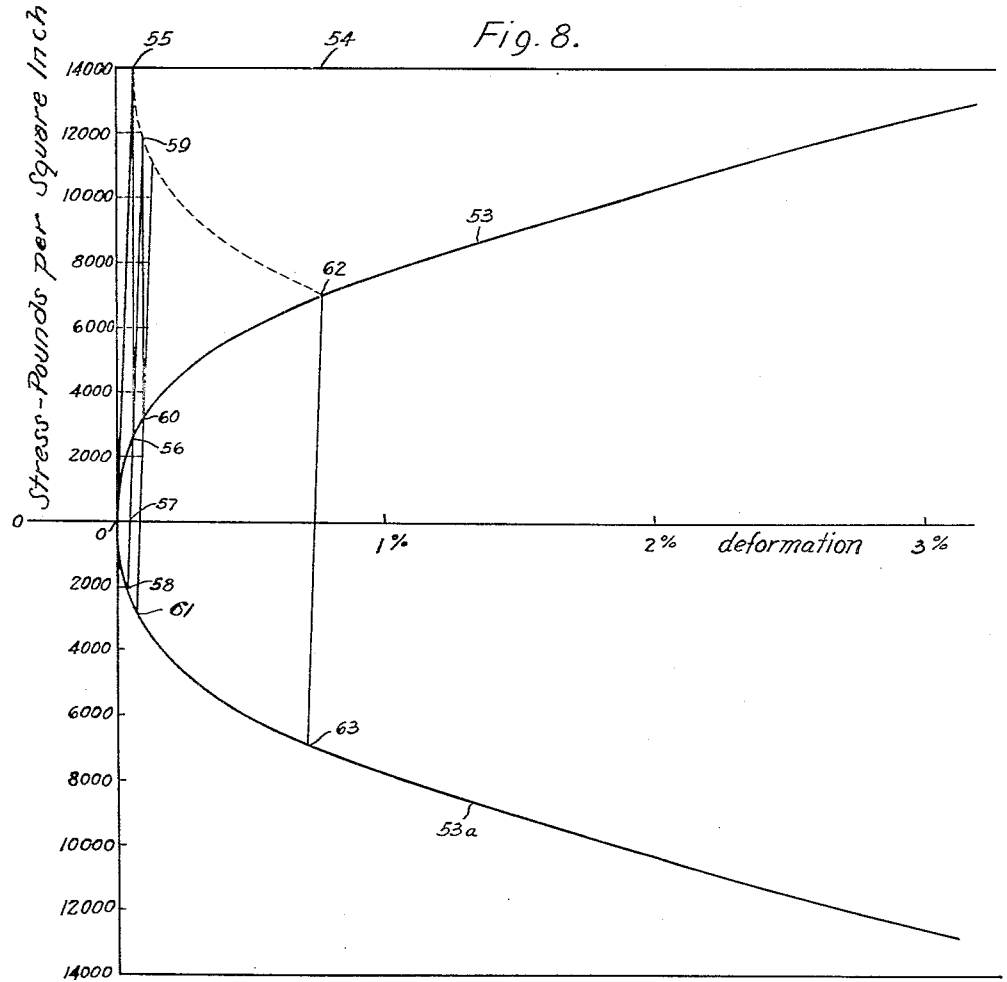
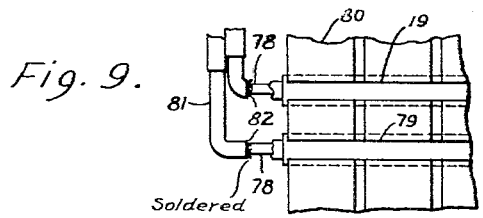
WITNESSES:
INVENTOR
Bennie A. Rose.
BY
ATTORNEY Patented Dec. 28, 1937

2,103,795

UNITED STATES PATENT OFFICE 2,103,795

TURBINE-GENERATOR FIELD-WINDING

Bennie A. Rose, Swissvale, Pa., assignor to Westinghouse Electric & Manufacturing Company, East Pittsburgh, Pa., a corporation of Pennsylvania Application January 4, 1936, Serial No. 57,535

10 Claims. (Cl. 171—206)

My invention relates to turbine-generator field-windings or other windings for the rotor members of dynamo-electric machines of the higher speed-ranges, particularly those of considerable capacity, such as 10,000 kva. and above.

The principal object of my invention is to provide a means for overcoming a type of failure which has been observed in practice, occurring in the end windings, or end-connection portions of the rotor coils, of turbo-generator field-windings. These windings are necessarily made of fairly heavy copper strap-conductors, and the end windings must be spaced apart from the core, and usually also from each other, by blocking which must be so arranged that it will permit a maximum amount of air-flow radially outwardly past the conductors, for cooling purposes. These end windings are insulated by means of channel members made of a composition product consisting of asbestos and a heat-hardened binder. These channels are fitted around the end windings and are necessarily quite thin, in order to conserve space and provide as much air-cooling of the copper conductors as possible.

It has been customary, prior to my present invention, to utilize rotor coils, for turbo-generators, made of annealed or softened copper, for various reasons, including the following. These coils were made of strap-conductors or bars which had to be rolled up in large pancake coils, for convenience in transportation and handling prior to the commencement of the actual formation of the field-coils of the dynamo-electric machine. These strap-conductors or bars had to be bent, in order to form the coils. Usually the bulge which was produced in the bending operation had to be pressed out of the coils at the corners where the bending was sharpest. Invariably, also, the straight portions of the coils, or the coil-sides which lie in the slots of the rotor core, had to be straightened by pounding, to remove the kinks or bends therein and to make them sufficiently straight. The coils which are formed by the above-described bending process have parallel coil-sides, and there is a further bending which must be done, in placing the coils in the slots of the rotor member, resulting in an arcuate bending of the end connections so that the coil-sides may lie in slots which are tilted angularly with respect to each other because of their circumferential displacement on the rotor member. For all of these reasons, it has been customary to utilize annealed copper for such coils.

Experience has shown, however, that such coils, particularly where utilized on long machines having a high speed so that the centrifugal force exerted on the coils is great, would gradually contract in service, pulling strongly on the end blocking of the end connections, and so distorting the end connections as to crack or break the asbestos-composition channel-insulators covering the same, resulting in a ground or short-circuit on the winding.

A little study of the cycle of heating and cooling of the generator rotor-member will enable one to understand just what is causing the trouble. At rest, the generator is at room temperature, possibly of the order of 25° C. When the generator is put into operation, the field coils begin to heat up, to a temperature which may ultimately be as high as 125° C., or 85° over a nominal ambient temperature of 40°. This temperature-rise of as much as 100° C. occurs in the field coils when the machine is operating at full speed, and the heavy centrifugal force and the consequently high friction against the retaining wedges prevent the coils from expanding freely, so that, in many cases, at least, certain lengths of the coils will be prevented from expanding faster than the iron of the rotor core, producing a high compressive stress, greater than the yield point of the copper. The resulting compressive yielding remains in the coils when the generator is shut down, because the absence of centrifugal force under these conditions permits the coils to creep inwardly as they cool. This progressive inward creeping or contraction of the coils continues until the copper is sufficiently strengthened to resist further stressing without yielding.

An object of my invention is to overcome the aforementioned difficulties by utilizing a copper which has been cold-worked or hardened sufficiently so that its yield point will be higher than the compressive forces which are developed by the frictional pressure of the coil-sides against the retaining wedges, due to the centrifugal pressure, or the compressive forces caused by the different thermal expansions of the copper of the windings and the iron or steel of rotor core.

In one form of embodiment of my invention, I utilize fully hardened copper, for the straight coil-side portions of the coil, which lie in the rotor slots, said copper having been hardened by cold-working sufficient to produce a reduction in cross-section of from 12 to 15%, or even larger amounts. The end connections are then made in separate U-shaped pieces of soft copper, and these are silver-soldered onto the ends of the respective straight coil-side pieces so as to provide complete coils. In spite of the hazard introduced by the 3600 joints, more or less, thereby necessitated, and in spite of the expense thereof, averaging somewhere around $1.00 per joint, the difficulties which my invention aims to correct are so serious as to warrant a resort to this construction in order to remove this cause of failure of the dynamo-electric machines.

According to a preferred form of embodiment of my invention, however, I make use of a known fact respecting the properties of copper which has been only partially hardened, by cold-working. It is well known that soft or fully annealed copper, or copper which has had no cold-working or hardening, has practically no yield point, but begins its plastic deformation almost immediately after stress is applied thereto. I utilize the term "plastic deformation" in contrast to "elastic deformation" in order to define a permanent set or deformation in the material.

When copper is hardened in the usually accepted sense, that is, fairly well hardened, by means of cold-working, there is a large increase in the yield point, or stress at which plastic deformation commences, so that the copper retains its elasticity up to a point which is fairly close to the point of failure; so that failure occurs relatively soon after yielding commences, as the stress is increased more and more. Hard-drawn copper is usually thought of as having been reduced at least 12 or 15°, and even as much as 50° or more, in its cross-sectional area, and this is the material which is ordinarily available as hard-drawn copper.

It is known, however, that, when copper is cold-worked just a little bit, there is an immediate material increase in the yield point of the copper, and this partially worked or partially hardened copper has a property which is lacking in the hard-drawn copper in that it can be bent to a certain extent, and may be given a permanent set or plastic deformation by such bending, thus making it possible to shape such partially worked copper, a thing which is practically impossible with hard-drawn copper because the hard-drawn copper begins to yield at a point which is so close to the ultimate strength of the copper that it will crack or break as a result of a very little bending.

According to a preferred form of my invention, I utilize such partially worked copper as a material with which to make the field-coils of turbo-generators of the larger sizes in which inward creeping of the rotor coils has been a problem when soft-copper windings were utilized. I find that it is sufficient to cold-work the copper to a reduction of 5 or 6% in the cross-section, or say from 4 to 10% in cross-section, in order to develop a yield point which is higher than the compressive stresses developed in the rotor as previously mentioned. I have also found that such an amount of cold-working results in a copper which is sufficiently plastic, beyond its yield point, to permit the necessary bending in order to form the coils, and the necessary straightening operation, to straighten the coil-sides, without producing cracks or breaks in the copper. I believe that this material of construction has never before been utilized in dynamo-electric machines, particularly in the rotor members of machines of great axial length or high speed, wherein problems of inward creeping of the rotor coils have been encountered.

A further object of my invention is to provide a process of forming rotor-coils for such machines, wherein the copper strap-material is first partially hardened, and then bent to form a coil, and subsequently the end-sections are annealed, in order both to facilitate the pressing out of the bulges caused by bending and to facilitate the assembly of the coils in the slots of the rotor.

With the foregoing and other objects in view, my invention consists in the structures, combinations, elements and processes hereinafter described and claimed and illustrated in the accompanying drawings wherein:

Figs. 3, 4, 5, and 6 are diagrammatic views illustrating successive steps in a preferred process of forming coils according to my invention.

Fig. 7 is a curve diagram showing the properties of soft copper and hardened copper of various degrees of hardness.

Fig. 8 is a curve diagram illustrative of the inward-creeping phenomenon which my invention seeks to avoid, and Fig. 9 is a fragmentary elevation of a portion of the end of a rotor member utilizing a different embodiment of my invention.

Figure 1:
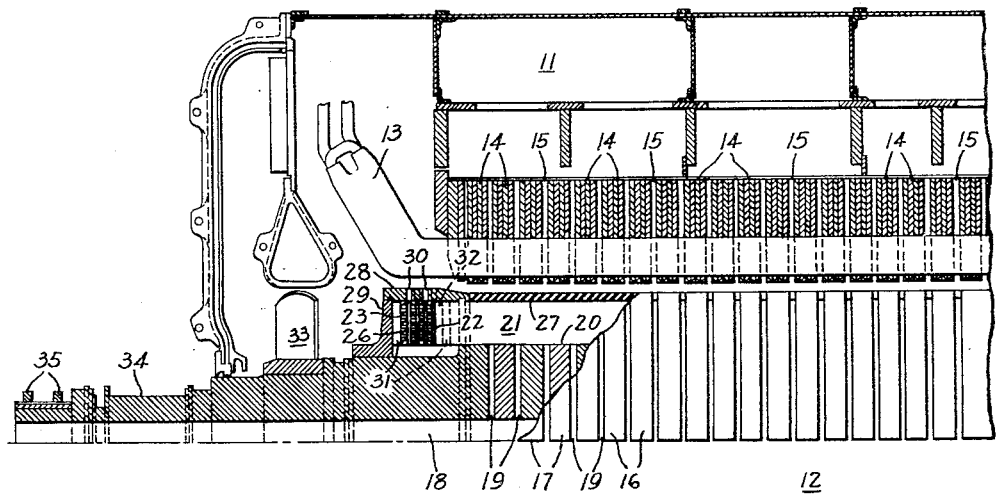
Figure 1 is a longitudinal sectional view of a portion of a turbo-generator embodying my invention.

In Fig. 1, my invention is shown, by way of example, as being embodied in a turbo-generator comprising a stator member 11 and a rotor member 12. The stator member 11 carries a stator winding 13 which is ordinarily the armature winding, or winding in which the electro-motive force is generated, in the machine. The stator winding 13 is carried by a stator core consisting of a large number of bundles of laminations 14, separated by radial vent-spaces 15.

The rotor member 12 is the field member, and is provided with an iron (in reality, steel) core 16 of the drum-type, that is, without salient poles. It is shown as being made up of a large number of separate solid rings 17 having a large central air-flow space 18 therein. The rings 17 are separated by radial air vents 19. The iron rings 17 of the rotor core 16 are provided with a number of slots 20 for receiving the rotor winding 21.

Turbo-generators, in general, are high-speed machines, and hence machines of considerable axial length, particularly in the larger sizes, because of the necessity for avoiding excessively large rotor diameters, so as to properly limit the centrifugal forces. Essentially, therefore, these machines are wound for either two or four poles, operating at speeds of 3600 R. P. M. and 1800 R. P. M., respectively, at 60 cycles, or 3000 and 1500 R. P. M., respectively, for 50-cycle generators; although occasionally such a machine may be wound for six poles, having speeds of 1200 and 1000 R. P. M., respectively.

Figure 2:
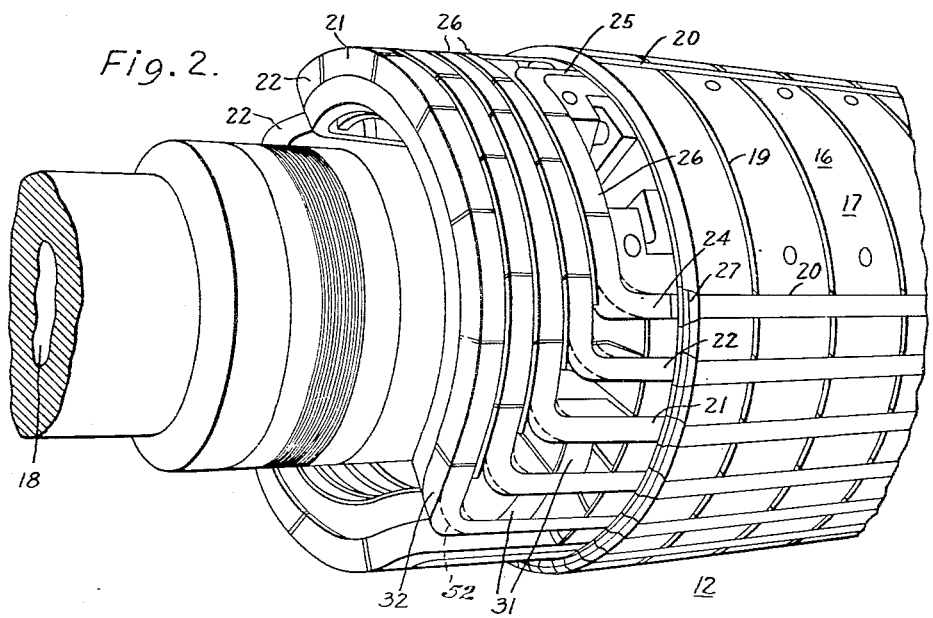
Fig. 2 is a perspective view of an end of a rotor member, with certain parts removed, the omitted parts including the retaining ring, the end plate and the blower.

In the particular machine illustrated in Figs. 1 and 2, a two-pole generator is shown. It will be observed, from Fig. 2, that the field winding 21 is arranged so as to produce two poles, and is made up of two groups of concentrically disposed coils 22, one group for each pole. Each coil consists of a large number of turns of a flat copper strap-material 23 having two straight coil-sides 24 and 25, and end-connections 26. The strap-portions constituting the coil-side 24 of any given strap-conductor coil 23 all lie in one of the rotor slots 20, being packed therein until the slot is substantially filled, after which the slot is closed by means of a wedge 27 which holds the coil-sides 24 packed tightly therein. The strap-portions forming the other coil-side 25 are disposed in another slot 20 which is displaced circumferentially around the rotor member from the first mentioned slot 20, so that the end-connections 26 for the bottom coil-sides are of smaller radius, and therefore of smaller circumferential length, than the end-connections for the top coil-sides, this circumstance being properly allowed for, in the formation of the coil, which has something like the shape shown in Fig. 6, before the coil is inserted in the dynamo-electric machine.

The rotor member 12 is also provided with a retaining ring 28 (Fig. 1) and an end plate 29 for holding the end connections 26 in place, at each end of the rotor member. The retaining ring and the end plate are usually provided with ventilating holes 30 for providing for a maximum access of air to the end connections. The end connections 26 are invariably braced by means of blocks 31 suitably disposed therebetween so as to hold them firmly and also admit of the maximum amount of air-cooling by reason of the air flowing radially outwardly between the end connections 26, by reason of centrifugal force.

The several coils of the rotor winding 21 are separately insulated, the insulation which is applied to the end-connections thereof being indicated in Fig. 2 as comprising channel-members 32 of an asbestos composition product or other suitable molded insulating material having a minimum thickness commensurate with the provision of adequate electrical insulation, so as to improve the heat-conductivity between the cooling air and the copper strap-material, thereby causing the copper to operate at a lower temperature, or enabling the designer to produce a machine coming within the fixed copper temperature-limits, with a minimum amount of copper.

The rotor member 12 is completed, as shown in Fig. 1, by a plurality of blades 33 comprising a blower, a journal-bearing portion 34, and a slip-ring portion 35 whereby current is carried to and from the rotor-winding 21, all of which will be readily understood by those skilled in the art.

According to the preferred form of my invention, shown in Figs. 1 and 2, the rotor winding is formed of a partially cold-worked copper strap, as previously described. The properties of soft copper and of cold-worked copper of various degrees of working or hardness are shown in the stress-strain curves reproduced in Fig. 7, wherein the curve 41 is plotted for a soft-copper bar in tension, while the curves 42, 43, 44, 45, and 46 are plotted for a copper bar of the same initial size, after it has been cold-rolled so as to produce cross-sectional reductions of different amounts, as shown, varying from 2½% to 15%, the stresses being calculated on the basis of the original cross-sectional area, that is, the area of the bar before cold-working. It will be observed that the soft copper, as shown by the curve 41, has substantially no straight-line portion, because the material begins yielding substantially immediately upon the application of tension, or stress of any kind; whereas all of the other curves show a straight-line portion, which defines the yield point at the point where the curve begins to slope away from the extension of the straight-line portion, as indicated at 47, 48, 49, 50, and 51. Ordinarily, the yield point is taken to be the stress which gives a 0.2% plastic deformation, and I use the term with this connotation in this specification and the accompanying claims.

It will be noted, from Fig. 7, that a copper bar with only a small amount of cold-working, resulting from a 2½% cross-sectional deformation, has a reasonably high yield point 47 of approximately 12,000 lbs. per square inch, while a copper bar cold-rolled to a 5% reduction will have a yield point 48 in excess of 16,000 lbs. per square inch, and a bar rolled to a 10% reduction will have a yield point 50 of around 24,000 lbs. per square inch, based on the original cross-sectional area of the soft-copper bar, or nearly 27,000 lbs. per square inch, based on the reduced cross-sectional area of the rolled bar. When as much as 15% cross-sectional deformation is produced by the cold-working, however, the yield point 51 is so high, compared to the ultimate strength of the material, that the copper cannot yield very much, under stresses higher than this yield point, without producing failure, thus emphasizing the necessity for keeping substantially below an amount of cold-working which produces such a high yield point in carrying out the objects of my invention as embodied in Figs. 1 and 2.

In general, I prefer to utilize an amount of cold-working which will provide a tensional yield point at least as high as 12,000 lbs. per square inch and less than 27,000 lbs. per square inch, based on the cross-section of the cold-worked bar.

While the curves in Fig. 7 indicate the performance of copper in tension, it will be readily understood that similar relations of yield points and general shapes of curves are obtained under compression, as tests have fully verified.

The forces which are developed on the coil-sides 24 and 25 which lie within the rotor slots 20 may readily be calculated from the frictional forces which are developed between the coil-sides and the under-surfaces of the wedges 27. At any distance $x$ from the end of the coil-sides, or from the end of the wedge, the compressive stress operating on the copper will be given by the formula:—

$$S = p f x,$$

where $p$ = centrifugal force of a unit volume of coil,
$f$ = friction coefficient, and
$x$ = distance from end of coil.

This formula holds good until the compressive stress S equals the maximum compressive load which will be produced by the temperature-changes in the copper and in the iron, after which the coil will slip, against the friction, and the compressive stress will be represented by the equation:—

$$S' = 14.5[17(T_c - T_o) - 11(T_i - T_o)],$$

where $14.5 \times 10^6$ = the modulus of elasticity of copper,
$17 \times 10^{-6}$ = the thermal coefficient of expansion of copper per °C.,
$11 \times 10^{-6}$ = the thermal coefficient of expansion of steel,
$T_c$ = the final temperature of the copper,
$T_i$ = the final temperature of the iron, and
$T_o$ = the initial room temperature.

For ordinary room temperatures of around 25° C., this formula reduces to $$S' = 14.5 T_c (17 - 11 T_i / T_c) - 2100.$$

The ratio $T_i / T_c$ of iron-temperature to copper-temperature is usually taken to be 0.7 for the size and type of turbo-generator to which my invention is applicable.

In general, these machines run upwards of 10,000 kw. in rating. In length, the machines vary according to the centrifugal force, that is, according to the diameter and the speed of the rotor. In a 3600 R. P. M. turbo-generator, it is desirable to resort to my special copper construction in machines having an axial length of about 6 feet or more, or possibly in machines as short as 4 feet in length. In an 1800 R. P. M. machine, it is usually advisable to apply my invention in machines having a length of 8 feet or more. In the shorter machines, the compressive stresses indicated by the symbol S may never reach the point S' at which frictional slippage of the rotor-bars begins, but in the longer machines, the compressive force will be a constant maximum, represented by S', in the central portions of the coil-sides, that is, midway between the ends of the rotor core, thereafter tapering off to zero at the ends of the core, according to the formula $S = pfx$.

The stresses indicated by the foregoing formulae for S and S' are in general greater than the extremely small yield point of soft copper, and hence the forces indicated by the formula are not obtained during a number of heating and cooling cycles of the machine, because the copper simply yields and refuses to withstand such compressive forces. The values indicated by the formulae are approached, as limiting values, as the coils are strengthened by their yielding, which yielding practically amounts to a cold-working of a coil.

There are several other factors which the foregoing formulae for the compressive stresses S and S' do not take into account, and which will operate to limit the actual coil-distortion to values somewhat below those given in the formulae. The principal ones of these factors are as follows.

(1) In shortening a certain percentage, under the compressive force, the coil must thicken a corresponding amount, and there is not sufficient space in the slot for the coil to thicken more than about 1% or up to 1½%, because of the tight fit of the wedge 27. (2) Another factor not covered by the formula given for the maximum compressive stress S', is that the stated formula assumes that the coil is free to contract, on cooling, whereas, in reality, the contraction of the coil is strongly opposed by the blocking of the end connections 26, which puts certain residual tensile stresses in the coil, thus limiting the subsequent compressive stress when the coil is reheated. Since it is these tensile stresses which distort the end-windings, as indicated at 52 in Fig. 2, and produce the failures against which my invention is directed, it is important to understand how they come about.

For an understanding of the development of the tension stresses in the coil-sides, reference may be made to the diagrammatic representation in Fig. 8, which is intended to assist in explaining my conception of the principles involved, rather than giving an exact scalar indication of the precise forces involved. In general, the forces will not be as great, and will not be developed in anything like as small a number of cycles, as indicated in Fig. 8.

The curve 53 in Fig. 8 shows the total deformation of annealed copper in compression, as a function of the stress; the curve 53a shows the deformation in tension. Let us assume, for example, that we wish to produce a rotor-winding suitable for a machine in which the maximum compressive force on the copper is $S' = 14,000$ lbs. per square inch, as indicated by the line 54. During the heating cycle, we could assume that the total deformation of the copper obeys Hooke's law, rising on a straight line 0—55 to the point of intersection with the horizontal line 54 representing the compressive stress of 14,000 lbs. per square inch. This could represent the expansion of the copper caused by the rise in temperature. The actual stress existing in the coil-side during the first cycle of heating would be smaller than 14,000 lbs. per square inch, being obtained by dropping a line vertically from the point 55 to the intersection with the compression curve 53, as indicated at 56. The copper would be in compression because its expansion had been opposed.

The cooling cycle may be represented by a line 56—57 drawn parallel to 0—55, intersecting the X-axis at 57. This represents a contraction of the copper which releases the compressive stresses therein. The copper is not quite cooled to room temperature, at this point, and if it were free to slide inwardly without opposition, the coil would retain the deformation 0—57 while it completed its cooling. If we assume, however, that the free inward sliding of the coil is prevented by the tightness of the blocking of the end connections, which blocking really becomes very tight after a few cycles, the completion of the cooling will take place along an extension of the line 56—57, until its intersection with the tension curve 53a as indicated at 58, thus representing the tension which is placed in the coil after it has cooled to room temperature.

Through a second cycle of heating and cooling the compression and contraction can be plotted on Fig. 8 from the point 58, so that the line 58—59 is parallel, and equal in length, to the line 0—55, corresponding to a compressional stress indicated by the point 60 on the curve 53, after which, cooling takes place until a deformation and tensional stress is produced as indicated by the point 61 on the curve 53a. This process continues, with the increment of plastic deformation becoming smaller and smaller, for each successive cycle of heating and cooling approaching a compressional limit indicated by the point 62, and a tensional limit indicated by the point 63.

From the foregoing explanation, it will be noted that both the compressional stress at 62 and the tensional stress at 63 will be the result of the plastic yielding of the copper, or of the bending away of the curve 53 from the original compression-line 0—55. According to my invention, a copper is chosen in which the compression-curve of the copper, corresponding to the curve 53 in Fig. 8, does not bend away materially from the straight-line portion until a stress is reached which is higher than the maximum compression stress which is produced by the operating conditions in the particular machine in question, for example, 14,000 lbs. per square inch in the particular machine assumed in Fig. 8. In this way, there will be no material permanent set or plastic deformation in the copper, and hence no material distortion as a result of a large number of successive cycles of heating and cooling. I have found that if the total amount of yielding due to a large number of thermal expansions and contractions, say after 100 cycles of heating and cooling, is ⅛ of an inch, or less, the insulation 32 on the end connections 26 is well able to withstand the distortion of 1/8 of an inch at each end. However, a distortion of ¼ of an inch at each end would be excessive for machines utilizing heat-hardened molded channels 32 on the end turns 26.

In general, I have found it advisable to apply my invention to all turbo-generators of the types in which heat-hardened moldable insulating channels such as 32 are utilized on the end turns.

In the process of manufacturing my field-coils 22, in the embodiment of my invention just described, I start out with a copper strap, or a bar-like conductor, designated by the numeral 65 in Fig. 3. This strap or bar is made of substantially pure, or electrolytic, copper, which has been drawn to such a size that when it is subsequently cold-rolled, in the process of my invention, it will be of the proper dimensions to fit the rotor-slots 20. I first completely anneal the copper strap 65 so that the ultimate strengthening existing in it after the completion of my process will be just that which is caused by the amount of cold-working which is intentionally put into it. I then cold-roll the strap 65, on its flat side, as indicated at 66 in Fig. 3, to a reduction in thickness of 5%, 6%, 7%, or in general, anywhere from 4% to 10%, depending upon the degree of hardening which is necessary to produce a yield point in excess of the compressional stresses in the particular machine for which the coil is designed. In general, there is little increase in the width of the coil, as a result of this rolling process, most of the copper flowing lengthwise into an increase in the length of the strap, so that a 5% reduction in thickness amounts to practically a 5% reduction in the cross-section of the strap. The cold-worked or rolled bar is indicated by the numeral 23.

After the rolling operation, the bar is wound into a large pancake coil 68 as indicated in Fig. 4, whereby the material may be easily handled and transported from the rolling mill to the coil-forming section of the shop. The forming operation is indicated diagrammatically in Fig. 4, and it consists in unwinding the strap 23 from the pancake coil 68, and bending it successively around a roller as indicated at 69, so as to build up a multi-turn coil as shown in Fig. 6, said coil having turns composed of progressively larger (or smaller) end-connections 26 and coil-sides 24 and 25.

The end-connections, or portions of the coil 22 which lie outside of the rotor-core 16, in reality comprise not only the short straight sections 26 between the bends 71 and 72 shown in Fig. 4, but also a few inches, or possibly up to about 12 inches, of extensions of the straight sides 24 and 25, as indicated at 73 and 74 in Fig. 4, because the coil projects out beyond the ends of the core. In order to facilitate the necessary flexing of these end-connections 73, 26, 74 in the process of fitting the successive coil-sides 24 and 25 into the rotor slots 20, it is quite desirable to soften or anneal these end-portions of the coil, and this annealing is also helpful in carrying out the usually desirable step of pressing out the bulges which have been produced at the bends 71 and 72 in the bending-step depicted in Fig. 4. The removal of the bulges will subsequently be described in connection with Fig. 6. For the foregoing reasons, I usually find it desirable to introduce an annealing operation after the coil-forming operation depicted in Fig. 4, and this annealing operation is indicated diagrammatically in Fig. 5 as consisting of the dipping of the end-connections 73, 26, 74 into a hot salt-bath 75, so that the straight sides 24 and 25 of the coil are immersed for about 12 inches of their length.

The process of pressing out the bulges formed at the bends 71 and 72 of Fig. 4 is a simple pressing process which is indicated diagrammatically by the press 76 in Fig. 6.

I have found, in my experience, that coils formed of copper having the hereinabove-described degrees of partial cold-working, and coils formed by the particular manufacturing processes hereinabove described in connection with Figs. 3 to 6, are the most economical for use in machines of the types which I have been discussing, and are eminently satisfactory. I wish it to be distinctly understood, however, that I do not regard my invention as being limited to the particular coils 22 which have been shown and described in connection with Figs. 1 to 7 of the drawings. In particular, it is quite practical to make the coil-sides 24 and 25 which lie within the rotor-slots separate from the end-connections 26 which lie outside of the rotor-slots, as illustrated in the embodiment of my invention shown in Fig. 9 of the drawings.

In Fig. 9, the coil-sides 78, lying within the rotor-slots 79, are straight lengths of hardened copper bars, long enough to extend through the rotor-core 80; and the end-connections 81 are U-shaped pieces of soft copper bars, which are silver-soldered onto the ends of the respective bars 78 at a plurality of joints which are indicated at 82 in Fig. 9. When this form of the invention is utilized, the coil-sides 78 may be cold-worked as hard as practicable, much harder than is possible in the form of my invention shown and described in connection with Figs. 1 to 7. While a very great cost is involved in making a large number of joints 82 which are necessary to be made in the process shown in Fig. 9, the expense is fully justified by the necessity for overcoming the failure of the machine which would otherwise result from the plastic yielding of the rotor copper.

While I have illustrated my copper strap 65 of Fig. 3 as being cold-worked by the rolling process, and while I prefer this particular process of cold-working, it is obvious that I am not limited thereto, as the strap could be cold-worked by other means, as by drawing or stretching.

It cannot be expected that the copper coils can be utilized in the rotors, with no contraction whatever over a very long period of time, because, although the material may have a sufficiently high yield point so that no yielding will be in evidence over short intervals at the stresses which are present, the long-time relaxation of the copper will be such that a shortening will certainly be present. I believe, however, that the elimination of the immediate plastic yielding which I have described in connection with my invention will certainly remove the real, basic cause for the excessive contractions which have been observed in some rotors in the past, and which have been the cause of the failures which I have sought to overcome by my invention.

While I have illustrated my invention in two different forms of embodiment, I desire such illustration to be taken in a suggestive sense rather than as being indicative of the absolute limits of the scope of my invention, as many substitutions and modifications will readily suggest themselves to the skilled workers of the art. I desire, therefore, that the appended claims shall be accorded the broadest construction consistent with their language and the prior art.

I claim as my invention:

1. In a dynamo-electric machine having a stator member and a drum-type, slotted rotor member, the combination, with said rotor member, of a winding having less than 8 poles and having coil-sides lying in the rotor slots, at least substantially all of those portions of said winding which lie in said slots being strap-conductors composed of copper which has been hardened at least sufficiently to give it a yield point at least as high as 10,000 pounds per square inch.

2. In a turbo-generator having a stator member and a drum-type, slotted, iron rotor member having slots of at least 4 feet in length, the combination, with said rotor member, of a winding having coil-sides lying in the rotor slots, at least substantially all of those portions of the winding which lie in said slots being composed of copper which has been cold-worked at least sufficiently to give it a yield point at least high enough to withstand the compressional stresses due to thermal expansions without yielding more than ⅛th of an inch after 100 cycles of heating and cooling.

3. In a dynamo-electric machine adapted to operate at a speed at least as high as 1500 revolutions per minute, and having a stator member and a drum-type, slotted, rotor member having slots of at least 4 feet in length, the combination, with said rotor member, of a winding having coil-sides lying in the rotor slots, at least substantially all of those portions of the winding which lie in said slots being composed of copper which has been cold-worked sufficiently to reduce its cross-section at least 4 per cent since the last annealing.

4. In a dynamo-electric machine adapted to operate at a speed at least as high as 1500 revolutions per minute, and having a stator member and a drum-type, slotted rotor member having slots of at least 4 feet in length, the combination with said rotor member, of a winding having coil-sides lying in the rotor slots, at least substantially all of those portions of the winding which lie in said slots being composed of a substantially pure-copper material having a tensional yield point at least as high as 12,000 pounds per square inch and less than 27,000 pounds per square inch.

5. In a dynamo-electric machine adapted to operate at a speed at least as high as 1200 revolutions per minute, and having a stator member and a drum-type, slotted rotor member, the combination, with said rotor member, of a winding comprising a plurality of formed coils comprising a copper bar having a hardness accompanied by a tensional yield point at least as high as 12,000 pounds per square inch and less than 27,000 pounds per square inch, so that said copper bar will withstand the binding necessary for forming the coils.

6. In a dynamo-electric machine having a stator member and a drum-type, slotted rotor member, the combination, with said rotor member, of a winding comprising a plurality of formed coils comprising a copper bar which has been cold-worked so as to reduce its cross-section at least 4 per cent, and not more than 12 per cent, since the last annealing.

7. In a dynamo-electric machine adapted to operate at a speed at least as high as 1200 revolutions per minute, and having a stator member and a drum-type, slotted rotor member having slots of at least 4 feet in length, the combination, with said rotor member, of a winding comprising a plurality of formed coils comprising a copper bar which has been cold-worked at least sufficiently to give it a yield point at least high enough to withstand the compressional stresses due to thermal expansions without yielding more than ⅛th of an inch after 100 cycles of heating and cooling, but not sufficiently to give it a yield point so high that said copper bar will not withstand the bending necessary for forming the coils.

8. The process of forming a coil for the rotor of a dynamo-electric machine, which comprises cold-working an annealed copper strap such an amount as to give it a yield point at least as high as 12,000 pounds per square inch and less than 27,000 pounds per square inch, and thereafter bending said strap to form the coil.

9. The process of forming a coil for the rotor of a dynamo-electric machine, which comprises cold-working an annealed copper strap as to reduce its cross-section at least 4 per cent, and not more than 12 per cent, and thereafter bending said strap to form the coil.

10. The process of forming a coil for the rotor of a dynamo-electric machine, which comprises cold-working an annealed copper strap such an amount as to give it a hardness accompanied by a tensional yield point at least as high as 12,000 pounds per square inch and less than 27,000 pounds per square inch, thereafter bending said strap to form the coil, and thereafter annealing only the end-connections of said coil, and portions contiguous thereto.

BENNIE A. ROSE.